May 8, 1923.
F. E. BAUERMEISTER
STEERING WHEEL LOCK
Filed July 25, 1922
1,454,663
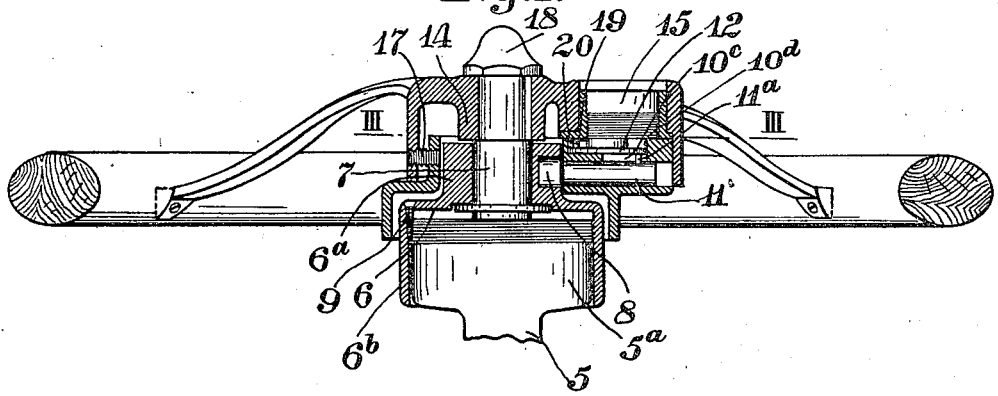
Fig.1.
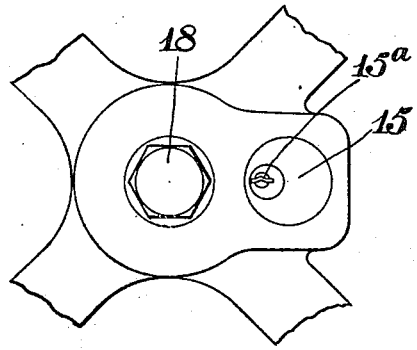
Fig.2.
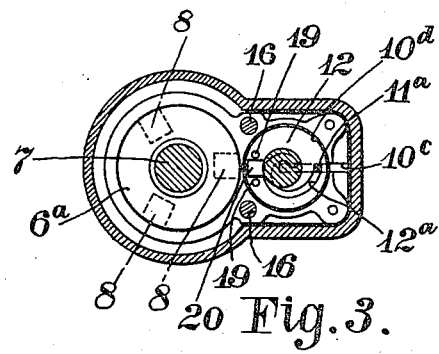
Fig.3.
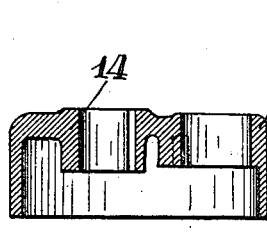
Fig.5.
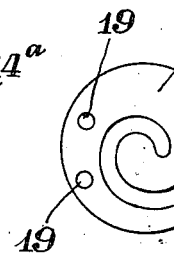
Fig.4.
Fig.6.
INVENTOR
FRED E. BAUERMEISTER Patented May 8, 1923.

1,454,663

UNITED STATES PATENT OFFICE.

FRED E. BAUERMEISTER, OF COLUMBUS, OHIO.

STEERING-WHEEL LOCK.

Application filed July 25, 1922. Serial No. 577,436.

*To all whom it may concern:*

Be it known that I, FRED E. BAUERMEISTER, a citizen of the United States, residing at Columbus, in the county of Franklin and State of Ohio, have invented a certain new and useful Improvement in Steering-Wheel Locks, of which the following is a specification.

The object of this invention is to provide an improved and simplified means for locking an automobile steering wheel whereby the time required to destroy and release the locking parts shall be so great as to deter an attempt to unlawfully appropriate the vehicle. Other objects will appear from the following disclosure.

The invention is embodied in the example herein shown and described, the features of novelty being finally claimed.

In the accompanying drawings—

Figure 1 is mainly a central sectional view on the axis of the steering wheel.

Fig. 2 is a top plan view of the hub and lock housing of the steering wheel.

Fig. 3 is a sectional view on the line III—III Fig. 1.

Fig. 4 is a plan view of the lock bolt operating cam disk.

Fig. 5 is a sectional view of the locking housing member alone.

Fig. 6 is a similar view of the lock base.

In the several views 5 designates the usual steering rod tube of the "Ford" automobile, said tube having at its upper end an enlarged portion $5^a$ containing the usual planetary gears (not shown) through which the steering rod is operated by manipulation of the steering wheel. 6 designates the steering gear cover, said cover being internally threaded to engage the externally threaded upper end of the enlarged portion $5^a$ referred to. The upper portion of the cover 6 is formed as a thick bushing or bearing $6^a$ it being open axially for the reception and passage of the short shaft 7 for operating the aforesaid planetary gears and the steering rod. The exterior of the bearing $6^a$ is provided with holes or sockets 8 equidistantly located around the bearing $6^a$ each adapted to receive the inner end of the locking bolt so that the steering post shall be locked from rotation when the front wheels of the vehicle are headed either straight ahead or to the right or to the left according to the socket engaged. The cover 6 is provided with a deep skirt $6^b$ to make access to the threads difficult and said cover is secured when turned home by means of a screw 9 inserted between the threads of the cover and tube. The lock base (shown alone in Fig. 6) includes a collar 10 that fits around the bushing $6^a$ and an expanded extension $10^a$ that covers and skirts the shoulder of the cover 6. The lock base also includes a lateral extension $10^b$ formed with a horizontal seat in which slides the bolt 11, said bolt having a pin $11^a$ in its upper side that travels in a guiding slot $10^c$ in the web above the bolt. Seated and fitting in a circular socket $10^d$ in the lateral extension above the bolt seat is a disk 12 having a volute slot $12^a$, said slot to receive the pin $11^a$ and said slot being so formed that when the disk is turned the bolt is thrown either inward or outward according to the direction of the turning of the disk. I prefer that the volute slot $12^a$ shall be of such length that one complete rotation of the disk shall be required to throw the bolt completely in or completely out. With such a slot and with the collar 10 fitting neatly around the bushing $6^a$ a complete rotation of the disk 12 is required to disengage the bolt from a socket 8. Moreover with such a slot movement of the bolt from any of its positions is resisted except by the application of turning force to the disk.

The lock housing is formed as the hub member of the spider of the steering wheel. Said housing includes a bushing 14 perforated and provided with a keyway to engage the upper end of the shaft 7 and an offset portion $14^a$ perforated to receive an ordinary pin lock 15 having a key hole at $15^a$ for the reception of a key to operate the lock as usual. The pin lock is inserted from the lower side of the perforation in the offset portion and is suitably flanged at its lower end to engage shoulders in the offset portion so that it cannot be removed in the upward direction. The lock base or frame is secured to the lock housing by means of vertical screws passed up from the base to the housing through holes at 16 and also by means of a horizontal screw 17 passed through the skirt of the lock housing and the lock base. The lateral extensions of the lock base and the lock housing are made to coincide so that the lower end of the pin lock lies over the cam disk and the lateral extension of the lock base is inclosed by the skirt of the lock housing so as to prevent access either to the bolt, the cam disk or the lower side of the pin lock. The steering wheel is secured to the upper end of the gear operating shaft by means of a cap nut 18.

The cam disk is provided with two upwardly projecting pins 19 between which projects a lateral finger 20 of the lock member 21 so that when that member is freed for rotation by the use of the appropriate key the finger 20 may be swung to rotate the cam disk and therefore move the bolt inward or outward with reference to a socket in the bushing of the tube cap to lock the steering wheel to or unlock it from said bushing. When the bolt is thrown inward to engage one of the sockets 8 the steering wheel cannot be turned to steer the vehicle, nor can the steering wheel be removed by removing the cap nut because the lock housing is secured by the lock base by screws and then the two structures by the bolt and the lock base and the last named member secured to the tube cab by concealed threads. The lock housing and its skirt and the lock base and its skirt, if made of good steel, render access to the confined securing members so difficult that even with the most effective tools and with highly skillful and quick work the bolt cannot be liberated within the period of time (now twenty minutes) fixed by the insurance underwriters as being the minimum required to justify its approval for insurance purposes.

The bolt sockets 8 are shown as slightly elongated longitudinally with reference to the axis of the gear operating shaft so as to allow for variation in the fitting of the gear cap to the tube and therefore insure access of the end of the locking bolt to the socket in different positions of the gear cap in relation to the gear operating shaft.

The forms of the parts can be changed without departing from the gist of the invention as claimed.

What I claim is:

1. Locking means for the steering wheel of a motor vehicle comprising, in combination, a cap for the steering column having a socket bolt receiving hub, means for securing said cap to the steering column, a lock base member fitting over said cap concealing the cap securing means and carrying a lock bolt adapted to be thrown radially with reference to the steering column into a socket of the socketed cap, said lock base member also carrying a rotary cam member operably connected with the lock bolt, a steering wheel having a spider provided with a cavity, a key operated cylinder lock in said cavity for actuating said cam member, said cylinder lock having its axis standing at right angles to the aforesaid bolt and confined and held between the spider and the lock base, concealed means for connecting the lock base and the spider, said spider having a wall concealing the outer end of said bolt, and means for securing the spider and lock base to the steering rod operating shaft.

2. Locking means for the steering wheel of a motor vehicle comprising, in combination, a cap for the steering column having a socketed bolt receiving hub, means for securing said cap to the steering column, a lock base member fitting over said cap concealing the cap securing means and carrying a lock bolt adapted to be thrown radially with reference to the steering column into a socket of the socketed cap, said lock base member also carrying a rotary three hundred and sixty degree cam member operably connected with the lock bolt, a steering wheel having a spider provided with a cavity, a key operated cylinder lock in said cavity for actuating said cam member, said cylinder lock having its axis standing at right angles to the aforesaid bolt and confined and held between the spider and the lock base, concealed means for connecting the lock base and the spider, said spider having a wall concealing the outer end of said bolt, and means for securing the spider and lock base to the steering rod operating shaft.

FRED E. BAUERMEISTER.